United States Patent [19]

Choudhury et al.

[11] Patent Number: 5,690,891
[45] Date of Patent: Nov. 25, 1997

[54] PROCESS FOR THE PRODUCTION OF ALLOYS IN AN INDUCTIVELY HEATED COLD-WALLED CRUCIBLE

[75] Inventors: Alok Choudhury, Püttlingen; Matthias Blum, Büdingen; Harald Scholz, Rodenbach; Georg Jarczyk, Grosskrotzenburg, all of Germany

[73] Assignee: Ald Vacuum Technologies GmbH, Erlensee, Germany

[21] Appl. No.: 594,009

[22] Filed: Jan. 30, 1996

[30] Foreign Application Priority Data

Feb. 10, 1995 [DE] Germany .................. 195 04 359.6

[51] Int. Cl.$^6$ ..................................... C22C 1/02
[52] U.S. Cl. ................ 420/590; 75/10.14; 420/418
[58] Field of Search .................. 75/10.14; 420/590, 420/418

[56] References Cited

U.S. PATENT DOCUMENTS

| | | | |
|---|---|---|---|
| 5,283,805 | 2/1994 | Kawano et al. | 373/156 |
| 5,284,620 | 2/1994 | Larsen, Jr. et al. | 420/590 |

FOREIGN PATENT DOCUMENTS

| | | | |
|---|---|---|---|
| 3230597 | 9/1988 | Japan | 75/10.14 |
| 790991 | 2/1958 | United Kingdom . | |

*Primary Examiner*—Melvyn Andrews
*Attorney, Agent, or Firm*—Felfe & Lynch

[57] ABSTRACT

In a process for the production of alloys from at least two alloy components (A, B, C, D, . . . ) with different melting points by melting in an inductively heated cold-walled crucible (1) with a cooled crucible base (3), in order to obtain an exact and homogeneous alloy composition at least a part of the alloy components (A, B, C, D, . . . ) are introduced into the cold-walled crucible (1) consecutively and in stacked fashion where either a) the alloy component (a) in each case with the lower melting point is introduced first or b) the alloy component in each case with the lower density is introduced first and following the introduction at least one of further alloy component the heating energy is switched on. The process serves preferably for the production of the intermetallic phase TiAl, where firstly the aluminium and then the titanium are stacked in the cold-walled crucible (1).

17 Claims, 2 Drawing Sheets

PROCESS FOR THE PRODUCTION OF ALLOYS IN AN INDUCTIVELY HEATED COLD-WALLED CRUCIBLE

BACKGROUND OF THE INVENTION

The invention relates to a process for the production of alloys from at least two alloy components (A, B, C, D, ...) with different melting points by melting in an inductively heated cold-walled crucible with a cooled crucible base.

The invention is concerned in particular with the melting of reactive, refractory metals and alloys in a cold-walled crucible furnace in a vacuum and/or in the presence of a protective gas, preferably in a vacuum.

In the case of conventional vacuum induction furnaces, the crucible, which is surrounded by the induction coil or a coil assembly, generally consists of a ceramic material, so that the considerable risk exists of contamination of the melt by ceramic particles. Alloys contaminated in this way are unserviceable for numerous purposes. It is also known to arrange a furnace wall composed of a non-magnetic material between the crucible and the induction coil in order to be able to arrange the induction coil outside of the vacuum. However, this in no way changes the fact that to permit the passage of the inductively applied energy, the crucible again consists of a ceramic material.

To protect the melt from contamination by ceramic particles, so-called cold-walled crucibles are known which consist of a water-cooled metallic hollow body which is likewise surrounded by an induction coil. Preferably the hollow body is composed of copper. In order here to allow the electromagnetic field to penetrate into the crucible contents, the metallic hollow body which forms the crucible wall is of slotted design. As a result of the slotting, inductive energy can be input-coupled into the material to be melted. The fundamental functioning capacity of such cold-walled crucibles has already been multiply tested.

Thus, for example, the melting of pure, reactive and refractory metals such as titanium, zirconium etc. can be carried out without ceramic contamination of the melt. In the case of the production of alloys based on individual alloy components with different melting points and densities problems arise, however, in a cold-walled crucible. The cause of these problems resides in the formation of a skull on the water-cooled crucible wall, in particular however on the crucible base.

The coil which surrounds the cold-walled crucible generates an electromagnetic field by which on the one hand the necessary energy is introduced in the material to be melted and on the other hand a force effect is applied to the current induced in the melt. This force causes the melt to be pushed away from the crucible wall. At the same time a flow arises in the melt leading to an unstable melt column, where the melt contacts the water-cooled crucible wall in a non-uniform and irregular fashion and solidifies to form a solid shell (skull).

The conventional charge of melting crucibles of all types consists, in the case of the production of alloys, of a blend of the individual alloy components which can be in the form of granulate, powder, sponge, chips and differently shaped pieces. Normally the individual alloy components possess different densities and melting points. Apart from the already described contamination of the melt by ceramic particles, no serious problems exist in the case of classical melting crucibles with regard to the composition and homogeneity of the alloy.

However, if this classical type of charge comprising a blend of the individual alloy components is transferred to the charge of a cold-walled crucible, firstly the chemical composition of the skull is purely random. This inevitably leads to an undefined composition of the liquid residual melt. To this must be added the fact that the denser alloy elements with a high melting point, such as for example niobium, vanadium, manganese, tantalum etc., drop down through the lighter melt consisting for example of aluminium and/or titanium and are incorporated in the solidified or solidifying skull on the water-cooled base of the cold-walled crucible without dissolving in the melt. They either remain here in undissolved form or dissolve very slowly in the melt, with the result that the productivity of the respective furnace is greatly reduced. This uncertainty with regard to the setting of the homogeneity of the alloys renders it impossible to achieve a reproducible, chemical composition of the alloy by the use of mixed alloy components in a cold-walled crucible furnace.

The microstructure, and thus the mechanical properties, of a material are however heavily dependent upon the chemical composition, as will be explained further in the detailed description. For this reason alloys are still currently remelted several times in vacuum-arc furnaces, and for the remelting ready-alloyed materials and pre-alloyed master alloys are used as melting electrodes (U.S. Pat. No. 4,738,713). However, this mode of operation is economically unviable for most purposes of use.

SUMMARY OF THE INVENTION

Therefore the object of the invention is to produce alloys with an extremely homogeneous distribution of the alloy components in a cold-walled crucible.

The described object is fulfilled by introducing at least a part of the alloy components (A, B, C, D, ...) into the cold-walled crucible consecutively and in stacked fashion where either a) the alloy component (A) in each case with the lower melting point is introduced first or b) the alloy component in each case with the lower density is introduced first and following the introduction at least of one further alloy component the heating energy is switched on.

The process according to the invention is a melting technique by which it is ensured that—commencing from the individual alloy components with different densities and melting points—a desired alloy with an exact chemical composition is produced. Contrary to previous experiences with cold-walled crucible furnaces, surprisingly it has proved that, by adherence to the charging technique according to the invention, an exact chemical composition of an alloy can be produced in a reproducible fashion. The problem of chemical inhomogeneity in the case of melting in a cold-walled crucible furnace of the above described type is solved in a simple way. The crux of the invention consists in that, in contrast to the previous charging practice, the alloy elements are introduced into the furnace not in blended form but, consecutively and in stacked fashion.

A considerable advantage is achieved simply in that, in the case of a multi-component alloy, the two first alloy components are introduced in the sequence of their melting points. However, it is particularly advantageous for the alloy components (A, B, C, D, ...) all to be stacked in the solid state in the cold-walled crucible in the sequence of their melting points, and then for the heating energy to be switched on.

Thus the charging takes place in the form of a first layer consisting of the metal with the lowest melting point, a second layer consisting of the metal with the next higher melting point, and a third layer consisting of the metal with the next higher melting point than in the second layer and so on.

If alloy components whose melting points are of a comparable order of magnitude differing by less than 50° C. are used, the density of these components applies as parameter for the sequence of the addition. In this case the component in each case with the lower density is introduced before the component in each case with the higher density.

When the cold-walled crucible has been charged as described in the aforegoing, the heating energy is switched on and the charge material is inductively heated. When the appropriate temperature has been reached, melting takes place of the component with the lowest melting point lying on the crucible base. The melt, which substantially consists of this material, forms a skull on the water-cooled crucible base, said skull possessing a defined thickness in dependence upon the crucible geometry, the cooling of the base, and the physical properties of the component. The components with a higher melting point are simultaneously strongly pre-heated in the phase and gradually slip into the molten component located in the lower part and dissolve, thereby forming the desired alloy with an exact chemical composition. The strong agitational effect of the electromagnetic or inductive field results in an excellent homogenization of the melt. As the base skull, which substantially consists of the component with the lowest melting point, does not participate in the actual alloy formation, the quantity of this alloy component lost due to the skull must be taken into account in the calculation of the dosage. This means that the alloy component (A) with the lowest melting point is introduced with an excess dosage such that the quantity of this alloy component which forms a skull on the crucible base is compensated.

Here it is particularly advantageous for the operating frequency of the induction coil to be selected, taking into account the density of the alloy melt and the height of the melt column, in such manner that a) close to the melt surface an induction current density is reached which is of such magnitude that a stable melt column forms in the cold-walled crucible under the force effect of the inductive field and b) the melt is withheld from the crucible wall except for a region on the crucible base.

This ensures that the liquid melt on the crucible base remains stable without contact with the crucible wall.

This stable state is achieved in a particularly advantageous fashion if the cold-walled crucible is surrounded by an induction coil which is upwardly divided into sub-coils and the sub-coils are supplied with individually regulated or controlled heating energy.

The process according to the invention is particularly advantageously suitable for the production of the intermetallic phase TiAl. In this case firstly the aluminium and then the titanium are stacked in the cold-walled crucible and then the heating energy is switched on.

In the case of alloys comprising the additional alloy components chromium and niobium, the particularly advantageous procedure is followed of stacking the alloy components in the cold-walled crucible in the sequence aluminium, titanium, chromium, niobium and then switching on the heating energy.

In a particularly advantageous fashion, here the aluminium is introduced into the cold-walled crucible as granulate and the titanium is introduced as titanium sponge.

DETAILED DESCRIPTION OF THE PREFERRED EMBODIMENT

Figure 1:
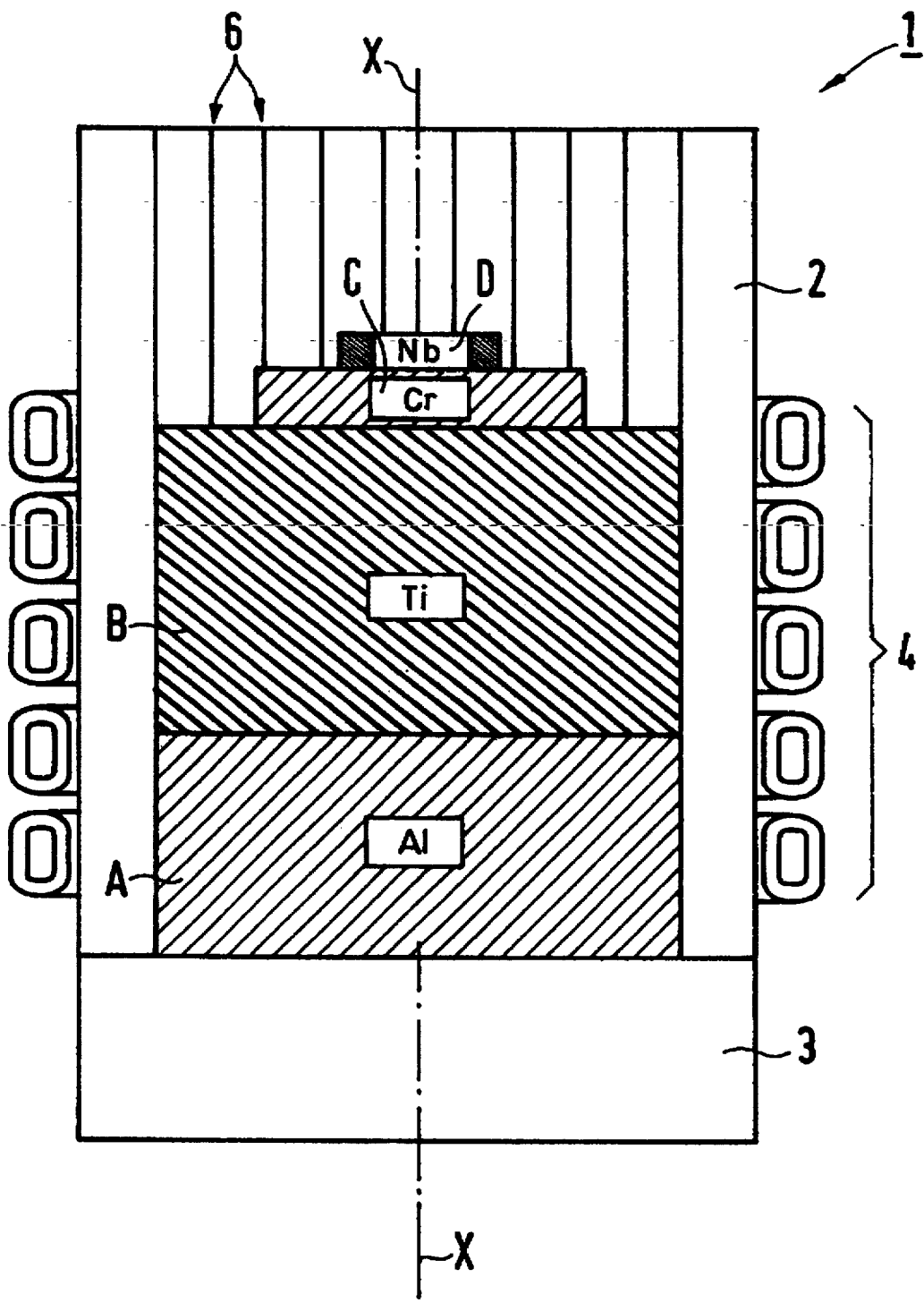
FIG. 1 is an axial section through a cold-walled crucible with a stacked charge consisting of four alloy components in the cold state.
Figure 2:
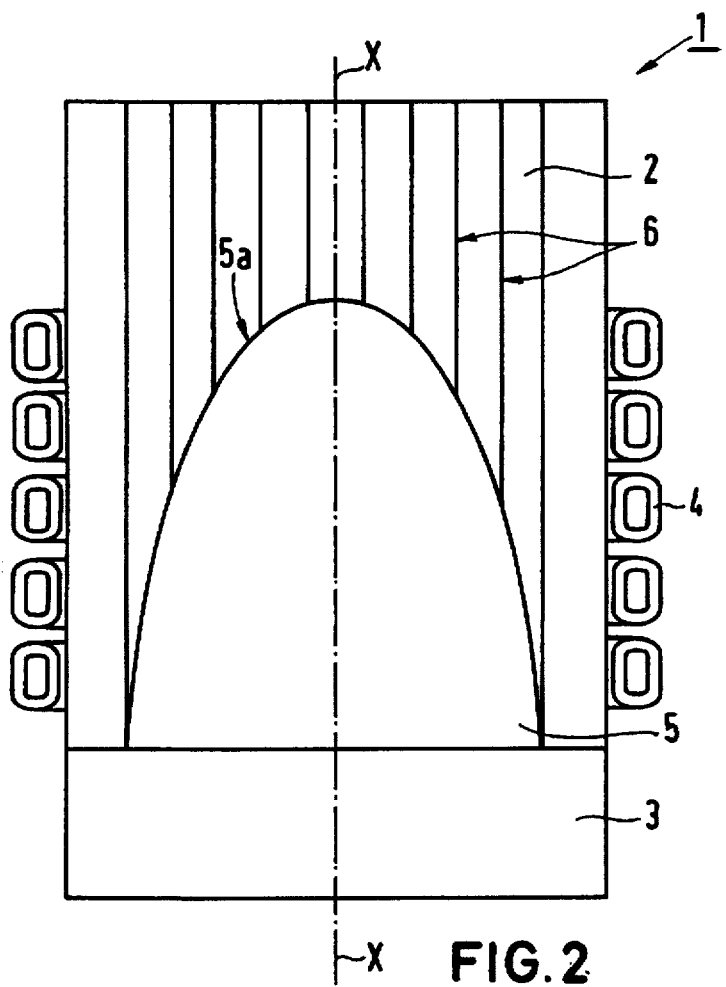
FIG. 2 illustrates the arrangement in accordance with FIG. 1 but after the melting of the entire charge and FIG. 3 shows a portion of a diagram of the two-component system TiAl with the dependency of the different phases upon the aluminium content of the melt in atom %.

FIGS. 1 and 2 illustrate a cold-walled crucible 1 which consists of a slotted crucible wall 2 in the form of a water-cooled hollow body and a crucible base 3 which likewise has the form of a water-cooled hollow body. For simplicity, the cooling water terminals have not been shown. However, it is also possible to replace the cooling water by another cooling medium. The crucible wall is surrounded by an induction coil 4 which supplies the necessary heating and melting energy. The current supply unit also has not been shown. As such arrangements of cold-walled crucible and induction coil—in themselves—are prior art, further discussion in this respect is superfluous here.

It should merely be noted that the induction coil 4 can be equipped with a larger number of turns and can be divided into individual sub-coils which can be connected to mutually independent current supply units. These can then be regulated or controlled separately from one another to permit a desired vertical adjustment of the heating power.

In FIG. 1 the alloy component A with the lowest melting point (in the present example aluminium with a melting point of approximately 660° C.) is arranged directly on the crucible base 3. Stacked above it is the alloy component B with the next higher melting point (in the present example titanium with a melting point of approximately 1660° C.). Stacked above the latter is the alloy component C (in the present example chromium with a melting point of approximately 1857° C.). A metal with a still higher melting point (in the present example niobium with a melting point of approximately 2468° C.) was stacked as uppermost alloy component D.

FIG. 2 illustrates the melt 5, formed from the alloy components A to D, in the form of an upwardly rounded column. Although this melt rests on the crucible base 3, it exhibits an upwardly increasing distance from the crucible wall 2, so that no skull forms in this region. The cold-walled crucible 1 possesses an axis X—X, i.e. the crucible wall 2 is formed—apart from the slots 6—as a hollow cylinder and the crucible base 3 has the form of a penetrated cylinder with the same outer diameter as the crucible wall 2. The melt 5 has a melt surface 5a in the form of an elliptical paraboloid of rotation.

Figure 3:
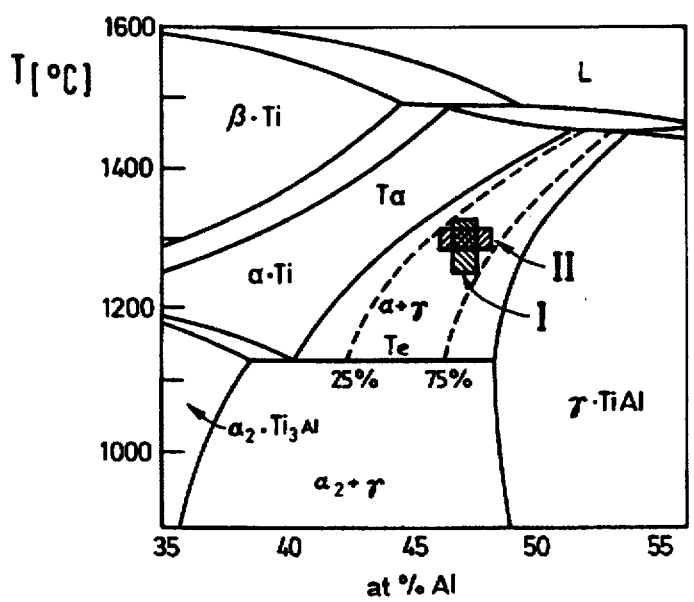

The significance exerted by the exact setting of the chemical composition upon the further processing of the alloy in order to achieve the desired mechanical properties of a material (for example an exhaust valve of a combustion engine) will be explained with reference to FIG. 3. In this case the diagram is that of a TiAl alloy (according to Dowling et al "TiAl-Based Alloys for Exhaust Valve Applications", published in "New Engine Design and Engine Component Technology", 1993, pages 30 to 38). The zone I shows that in the case of an exact composition of the alloy, the temperature field for the thermal treatment of the material is greater, whereby an optimal microstructure and thus optimal mechanical properties are to be achieved. The zone II illustrates that in the case of a broader analysis range of the alloy the temperature window for the thermal treatment is substantially smaller. If the analysis range is extended only by 1 atom % aluminium, it is impossible, in the case of the same thermal treatment of the components, to achieve identical microstructures and mechanical properties of all the components. This is still impossible even if the alloy composition does not fall outside of the resistance range of the intermetallic phase TiAl and if the chemical composition falls within the resistance range of the TiAl phase. This is the reason, already described in the aforegoing, why, in accordance with current viewpoints, the corresponding alloys are still remelted several times in vacuum-arc furnaces and ready-alloyed material and pre-alloyed master alloys are used in such cases.

EXAMPLE

In a cold-walled crucible according to FIGS. 1 and 2 with a nominal volume of 4000 cm$^3$ for the production of the intermetallic phase TiAl the following elements were introduced in an upwards direction:

1635 g aluminium granulate
3047 g titanium sponge
132.5 g chromium
235.5 g niobium.

The stacking here corresponds to that according to FIG. 1.

Then the furnace chamber, which surrounds the cold-walled crucible 1 and which has not been shown, is closed and evacuated to a pressure of 10$^{-1}$ mbar and the electrical energy is switched on with an operating frequency of 10 kHz and a power of 220 kW. During the melting period it could be observed that with the liquification of the aluminium lying on the crucible base, the elements titanium, chromium and niobium dropped down and consecutively dissolved in the forming melt. After 20 minutes the entire charge was in liquid form. The melt column 5 remained stable on the crucible base 3 in accordance with FIG. 2 without forming a skull on the crucible wall. After a further five minutes the melt was drawn off. The following table shows the attained chemical composition of the melt with contrasting theoretical—and actual values. It was proved that in the case of the process according to the invention an exact chemical composition of the alloy is achieved in a cold-walled crucible even when individual elements with different densities and melting points are used:

|  | Ti | | Al | | Cr | | Nb | |
| --- | --- | --- | --- | --- | --- | --- | --- | --- |
|  | Weight % | At % | Weight % | At % | Weight % | At % | Weight % | At % |
| Theor. | 60.33 | 49.02 | 32.38 | 47.03 | 2.62 | 1.98 | 4.66 | 1.97 |
| Actual | 60.30 | 49.24 | 32.33 | 46.80 | 2.65 | 1.98 | 4.70 | 1.98 |

We claim:

1. A process for the production of an alloy containing at least two alloy components, each component having a melting point and a density, said process comprising providing a cold walled crucible having inside walls and a base, and surrounded by induction coil means which provides heating energy to a material in the crucible, first introducing into the crucible a first alloy component having the lowest melting point of the alloy components, said first alloy component being introduced in solid form, subsequently and sequentially introducing into the crucible at least one additional alloy component in solid form over the first alloy component, said at least one additional alloy component comprising a second alloy component having a higher melting point than said first alloy component, and switching on the induction coil means which provides sufficient heating energy to melt the alloy components in the crucible.

2. A process as in claim 1 wherein alloy components having melting points which differ by less than 50° C. are stacked one above the other in order of increasing density.

3. A process as in claim 1 wherein said alloy components are stacked one above the other in order of increasing melting point.

4. A process as in claim 3 wherein the second alloy component consists of titanium and the first alloy component consists of aluminum, wherein the aluminum is introduced first and the titanium is stacked above the aluminum.

5. A process as in claim 4 wherein said alloy components further comprise a third alloy component consisting of chromium and a fourth alloy component consisting of niobium, said chromium and niobium being stacked sequentially above said titanium.

6. A process as in claim 4 wherein said aluminum is introduced into said crucible as granulate and said titanium is introduced as titanium sponge.

7. A process as in claim 3 wherein the alloy component having the lowest melting point is introduced in an amount exceeding the desired fractional amount in the alloy.

8. A process as in claim 1 wherein said induction coil is operated at an AC frequency selected so that the alloy components form a stable melt column having a surface which is spaced from said inside walls.

9. A process as in claim 8 wherein said AC frequency is between 6 and 15 kHz.

10. A process as in claim 9 wherein said AC frequency is between 8 and 12 kHz.

11. A process as in claim 1 wherein said alloy components are melted in a vacuum.

12. A process as in claim 1 wherein said alloy components are melted in a protective gas atmosphere.

13. A process as in claim 11 wherein said crucible is charged only with said metal alloy components.

14. A process for the production of an alloy containing at least two components having melting points which differ by less than 50° C., each component having a density, said process comprising providing a cold walled crucible having inside walls and a base, and surrounded by induction coil means which provides heating energy to a material in the crucible, first introducing into the crucible a first alloy component having the lowest density of the alloy components, said first alloy component being introduced in solid form, subsequently and sequentially introducing into the crucible at least one additional alloy component in solid form over the first alloy component, said at least one additional alloy component comprising a second alloy component having a higher density than said first alloy component and a melting point which differs by less than 50° C. from the point of the first alloy component, and switching on the induction coil means which provides sufficient heating energy to melt the alloy components in the crucible.

15. A process as in claim 14 wherein said alloy components are melted in a vacuum.

16. A process as in claim 14 wherein said alloy components are melted in a protective gas atmosphere.

17. A process as in claim 14 wherein said crucible is charged only with said metal alloy components.

* * * * *